United States Patent
Sakai et al.

(10) Patent No.: US 12,492,943 B2
(45) Date of Patent: Dec. 9, 2025

(54) GENERATION DEVICE, GENERATION SYSTEM, PROCESSING SYSTEM, GENERATION METHOD, AND STORAGE MEDIUM

(71) Applicants: KABUSHIKI KAISHA TOSHIBA, Tokyo (JP); TOSHIBA CARRIER CORPORATION, Kawasaki (JP)

(72) Inventors: Risa Sakai, Kanagawa (JP); Takeshi Yanagimachi, Kanagawa (JP); Hiroyuki Ikeda, Kanagawa (JP); Shinya Komure, Kanagawa (JP)

(73) Assignees: Kabushiki Kaisha Toshiba, Kawasaki (JP); Toshiba Carrier Corporation, Kawasaki (JP)

( * ) Notice: Subject to any disclaimer, the term of this patent is extended or adjusted under 35 U.S.C. 154(b) by 680 days.

(21) Appl. No.: 17/852,318

(22) Filed: Jun. 28, 2022

(65) Prior Publication Data

US 2023/0083316 A1 Mar. 16, 2023

(30) Foreign Application Priority Data

Sep. 10, 2021 (JP) .................. 2021-147870

(51) Int. Cl.
*G01J 5/48* (2022.01)
*G01J 5/00* (2022.01)

(52) U.S. Cl.
CPC .......... *G01J 5/485* (2022.01); *G01J 5/0066* (2013.01); *G01J 2005/0077* (2013.01); *G01J 2005/0092* (2013.01)

(58) Field of Classification Search
CPC .... G01J 5/485; G01J 5/006; G01J 2005/0077; G01J 2005/0092
(Continued)

(56) References Cited

U.S. PATENT DOCUMENTS

| 2010/0183207 A1 | 7/2010 | Sakaguchi et al. |
| 2013/0077650 A1* | 3/2013 | Traxler .................. G01N 25/72 374/5 |

(Continued)

FOREIGN PATENT DOCUMENTS

| CN | 101785679 A | 7/2010 | |
| CN | 102159940 B * | 12/2013 | ............. G01N 25/72 |

(Continued)

OTHER PUBLICATIONS

Japan Patent Office, Office Action in JP App. No. 2021-147870 (May 2, 2025).

*Primary Examiner* — Mirellys Jagan
(74) *Attorney, Agent, or Firm* — Finnegan, Henderson, Farabow, Garrett & Dunner, LLP

(57) ABSTRACT

According to one embodiment, a generation device acquires a plurality of images of a temperature distribution of a conveyance object. The images are generated by a thermal camera. The generation device sets a plurality of measurement areas in each of the images along a conveyance direction of the conveyance object. The generation device generates time-series data of temperature change over time for each of the plurality of measurement areas. The generation device generates a temperature profile of temperature change over time of the conveyance object by using a portion of temperatures extracted from the time-series data of the plurality of measurement areas.

9 Claims, 13 Drawing Sheets

(58) Field of Classification Search
USPC .......................................................... 374/124
See application file for complete search history.

(56) References Cited

U.S. PATENT DOCUMENTS

| | | |
|---|---|---|
| 2014/0300890 A1 | 10/2014 | Lange et al. |
| 2014/0301648 A1 | 10/2014 | Kato et al. |
| 2018/0214110 A1 | 8/2018 | Igarashi |
| 2021/0192255 A1 | 6/2021 | Taki et al. |

FOREIGN PATENT DOCUMENTS

| | | | |
|---|---|---|---|
| CN | 104103069 A | | 10/2014 |
| CN | 105717163 A | * | 6/2016 |
| CN | 108771546 A | | 11/2018 |
| CN | 112703507 A | | 4/2021 |
| JP | H6-21643 A | | 1/1994 |
| JP | 2012-49580 A | | 3/2012 |
| JP | 2016-99296 A | | 5/2016 |
| JP | 2019-208039 A | | 12/2019 |
| KR | 2011026047 A | * | 3/2011 |

* cited by examiner

GENERATION DEVICE, GENERATION SYSTEM, PROCESSING SYSTEM, GENERATION METHOD, AND STORAGE MEDIUM

CROSS-REFERENCE TO RELATED APPLICATIONS

This application is based upon and claims the benefit of priority from Japanese Patent Application No. 2021-147870, filed on Sep. 10, 2021; the entire contents of which are incorporated herein by reference.

FIELD

Embodiments described herein relate generally to a generation device, a generation system, a processing system, a generation method, and a storage medium.

BACKGROUND

In production, heat processing of a workpiece may be performed to melt, join, thermally activate, etc. There are cases where the workpiece is conveyed while undergoing heat processing. Technology that can acquire a temperature profile for such a conveyance object is desirable.

DETAILED DESCRIPTION

Figure 1:
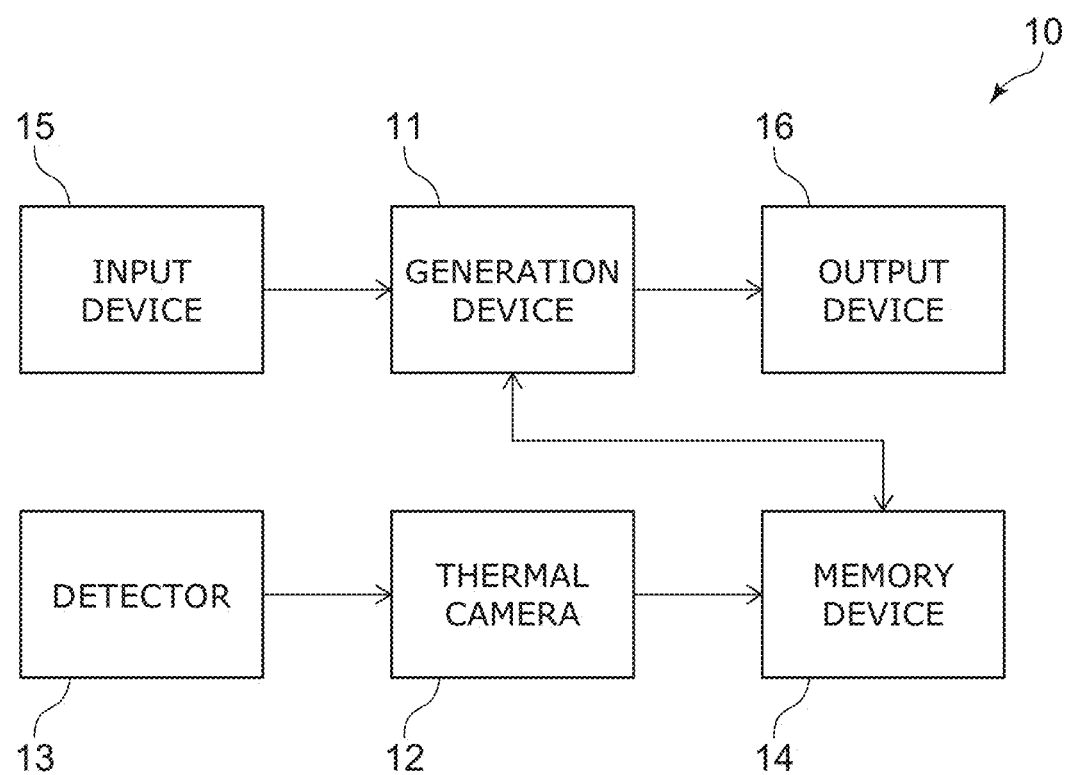
FIG. 1 is a schematic view showing a generation system according to an embodiment.

According to one embodiment, a generation device acquires a plurality of images of a temperature distribution of a conveyance object. The images are generated by a thermal camera. The generation device sets a plurality of measurement areas in each of the images along a conveyance direction of the conveyance object. The generation device generates time-series data of temperature change over time for each of the plurality of measurement areas. The generation device generates a temperature profile of temperature change over time of the conveyance object by using a portion of temperatures extracted from the time-series data of the plurality of measurement areas.

Various embodiments are described below with reference to the accompanying drawings.

In the specification and drawings, components similar to those described previously or illustrated in an antecedent drawing are marked with like reference numerals, and a detailed description is omitted as appropriate.

FIG. 1 is a schematic view showing a generation system according to an embodiment.

The generation system according to the embodiment is used to generate a temperature profile of a conveyance object that is being conveyed in a designated direction. As shown in FIG. 1, the generation system 10 includes a generation device 11, a thermal camera 12, a detector 13, a memory device 14, an input device 15, and an output device 16.

The thermal camera 12 detects the surface temperature of the conveyance object and its surroundings, and acquires images (thermal images) of the temperature distribution. The generation device 11 uses the images to generate a temperature profile of the conveyance object. The detector 13 detects the approach of the conveyance object. As appropriate, the memory device 14 stores the images acquired by the thermal camera 12, data used in the processing of the generation device 11, data obtained by the processing of the generation device 11, etc. The input device 15 is used by a user to input data to the generation device 11. The output device 16 outputs data to the user.

Figure 2:
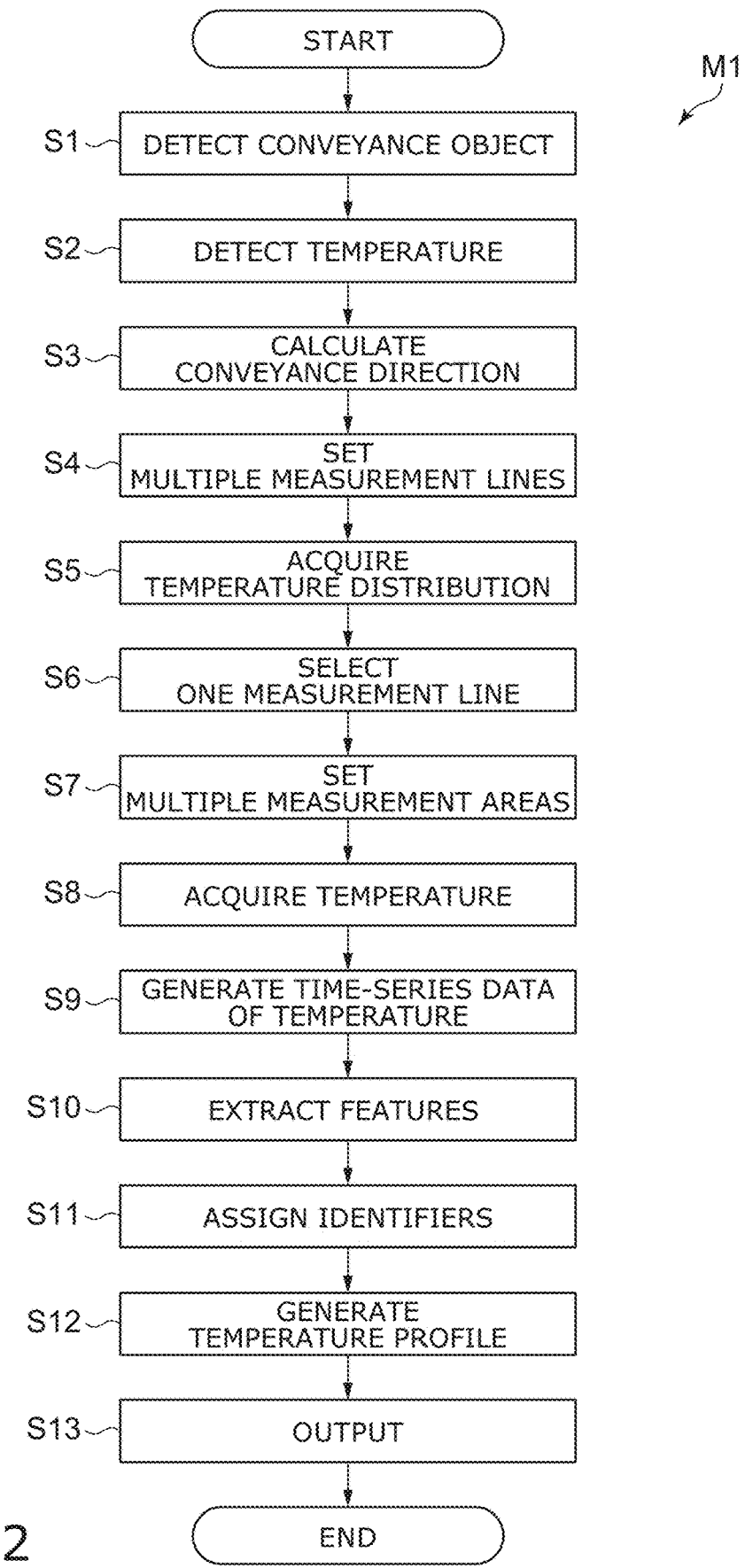
FIG. 2 is a flowchart showing a generation method according to the embodiment.

FIG. 2 is a flowchart showing a generation method according to the embodiment.

The generation method M1 of the temperature profile shown in FIG. 2 includes steps S1 to S13. First, the detector 13 detects the conveyance object approaching a designated position (step S1). For example, the detector 13 detects the conveyance object approaching the detection range of the thermal camera 12. The detector 13 includes at least one selected from a proximity sensor, a distance sensor, a through-beam sensor, and a pressure sensor.

Figure 3:
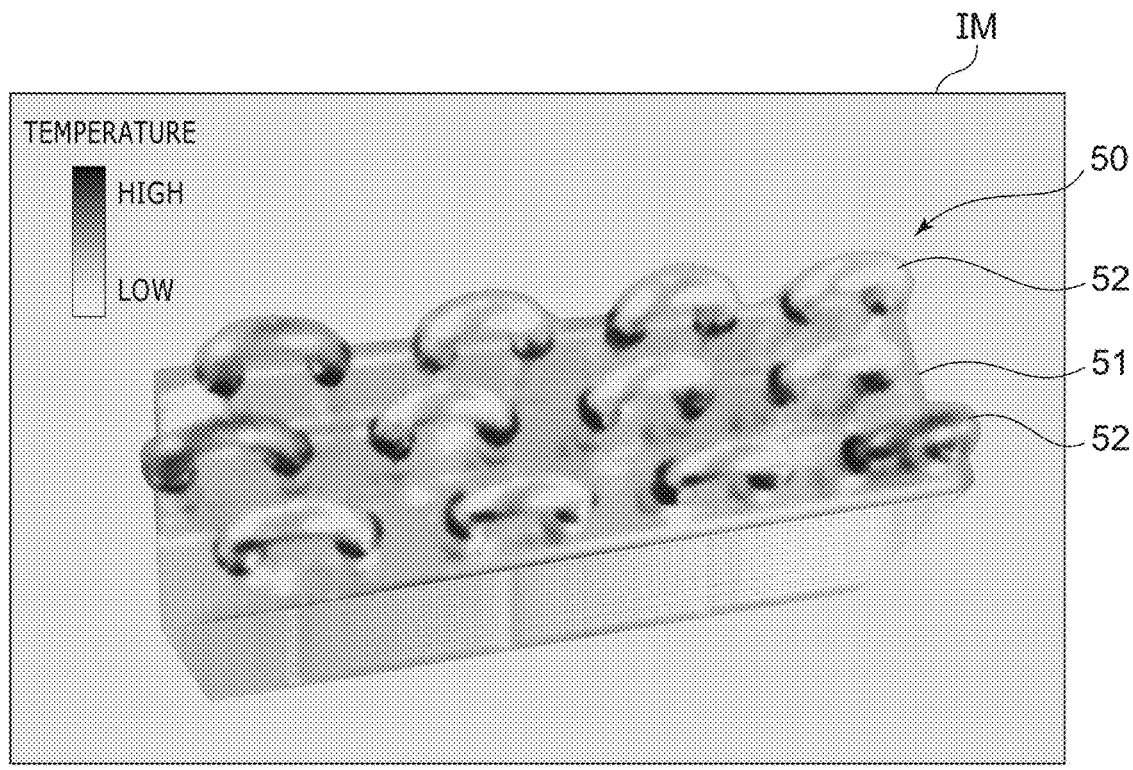
FIG. 3 is an example of a thermal image acquired by the thermal camera.

FIG. 3 is an example of a thermal image acquired by the thermal camera.

The conveyance object shown in the example of FIG. 3 is a workpiece 50 in which multiple pipes 52 are joined to a member 51. The member 51 may be rectangular. The member 51 can be used as a housing. The thermal camera 12 starts detecting the temperature in response to the detector 13 detecting the conveyance object (step S2). For example, the thermal camera 12 includes multiple infrared sensors. As shown in FIG. 3, the thermal camera 12 generates an image IM of the temperature detection result. The thermal camera 12 is fixed at a designated position and repeatedly detects the temperature and generates images. In the consecutively generated images, the conveyance object moves in the conveyance direction. The thermal camera 12 stores the generated images in the memory device 14. Or, the thermal camera 12 may directly transmit the images to the generation device 11.

The generation device 11 acquires the multiple images generated by the thermal camera 12. The generation device 11 calculates the conveyance direction of the conveyance object based on the multiple images (step S3). For example, the generation device 11 extracts feature points from each of the images. The generation device 11 finds correspondence between the extracted feature points of the images. The movement direction between corresponding feature points corresponds to the conveyance direction. Or, the conveyance direction may be input by the user.

The generation device 11 may also calculate the movement amount of the conveyance object based on multiple temporally consecutive images. The generation device 11 calculates the distance between the extracted feature points as the movement amount of the conveyance object in the temperature detection interval. The calculated movement amount is utilized to set the measurement area described below.

Figure 4:
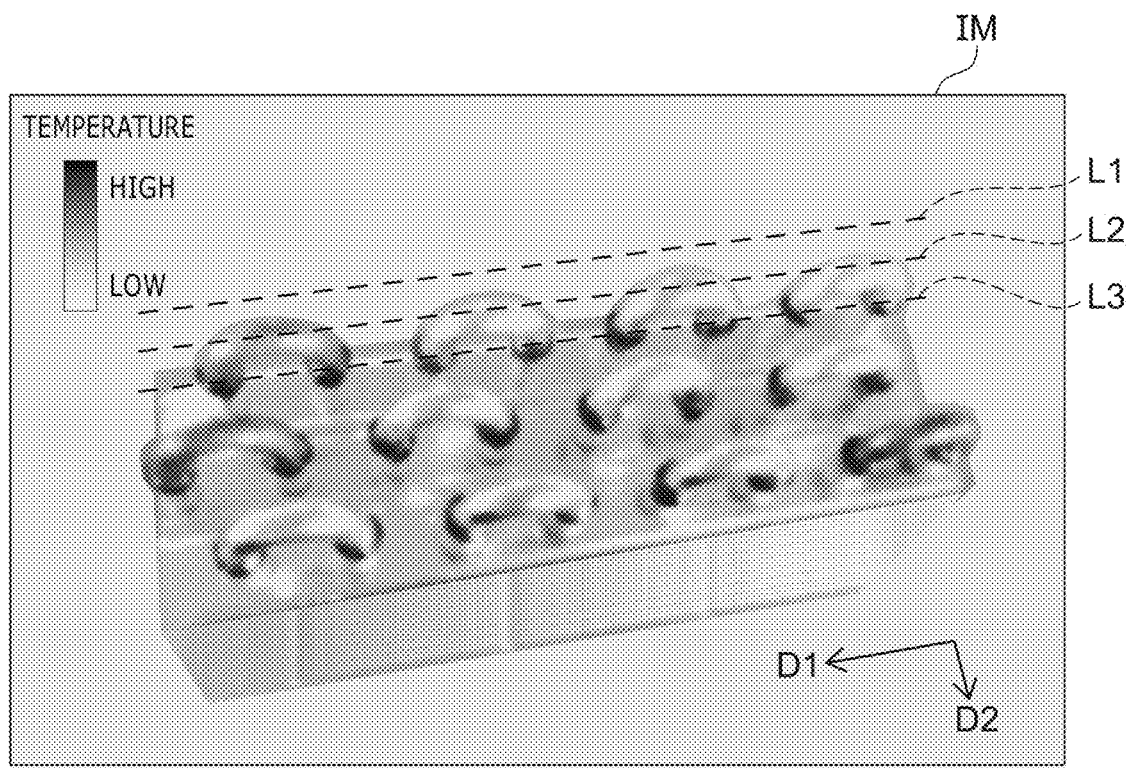
FIG. 4 is an image of an example of setting a measurement line.

FIG. 4 is an image of an example of setting a measurement line.

The generation device 11 selects one of the images. The generation device 11 sets measurement lines for the selected image (step S4). As shown in FIG. 4, multiple measurement lines L1 to L3 are set in an orthogonal direction D2 that is orthogonal to a conveyance direction D1. Each of the measurement lines L1 to L3 is set along the conveyance direction D1. The number of measurement lines, the spacing between measurement lines, and the length of each measurement line are preset by the user. The number and lengths of measurement lines may be automatically set by the generation device 11 based on the detection range of the thermal camera 12, the size of the conveyance object, etc.

Figure 5A:
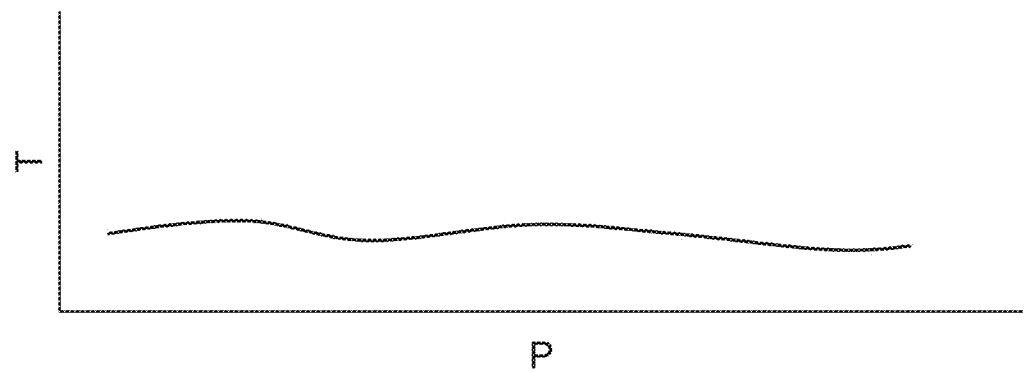
FIGS. 5A to 5C are graphs showing examples of temperature distributions of the measurement lines.
Figure 5B:
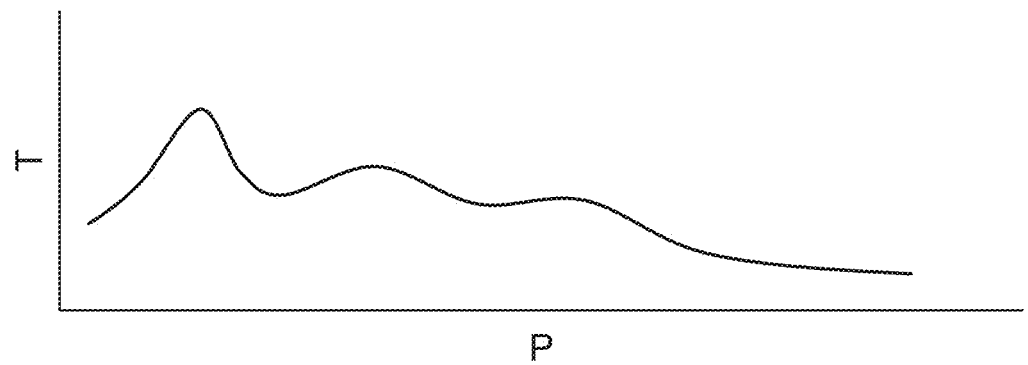
Figure 5C:
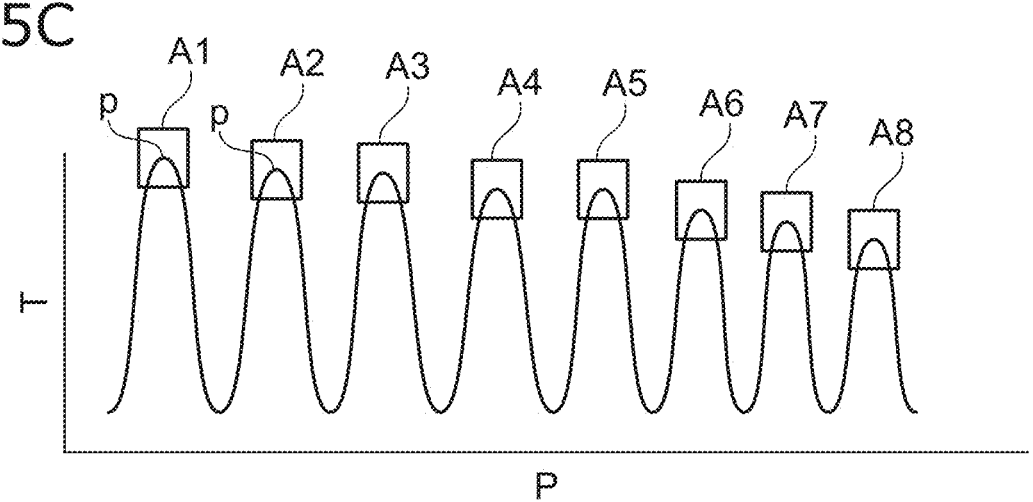

FIGS. 5A to 5C are graphs showing examples of temperature distributions of the measurement lines.

The generation device 11 acquires the temperature distribution at each measurement line (step S5). FIGS. 5A to 5C respectively show the temperature distributions at the measurement lines L1 to L3. In FIGS. 5A to 5C, the horizontal axis is a position P along the measurement line, and the vertical axis is a temperature T. The generation device 11 selects one measurement line from the multiple measurement lines for which a temperature distribution that satisfies a preset condition is obtained (step S6).

The condition is set according to the relationship between the temperatures of the points to be monitored and the temperatures around the points. For example, when the points to be monitored have higher temperatures than the periphery of the points, the condition is the occurrence of a temperature greater than a threshold, the occurrence of a positive temperature peak, or the occurrence of a positive temperature gradient not less than a threshold. When the points to be monitored have lower temperatures than the periphery of the points, the condition is the occurrence of a temperature less than a threshold, the occurrence of a negative temperature peak, or the occurrence of a negative temperature gradient not less than a threshold.

In the example, the repeating occurrence of positive peaks is set as the condition. Among the measurement lines L1 to L3, the measurement line L3 in which positive peaks p repeatedly occur in the temperature distribution is selected by the generation device 11.

The condition also may include a comparison between temperature distributions. For example, when the points to be monitored have higher temperatures than the periphery of the points, and when there are multiple temperature distributions in which the temperature is greater than the threshold or positive temperature peaks occur, the one temperature distribution that has the maximum temperature among the temperature distributions is selected. When the points to be monitored have lower temperatures than the periphery of the points, and when there are multiple temperature distributions in which the temperature is less than the threshold or negative temperature peaks occur, the one temperature distribution that has the minimum temperature among the temperature distributions is selected.

Figure 6:
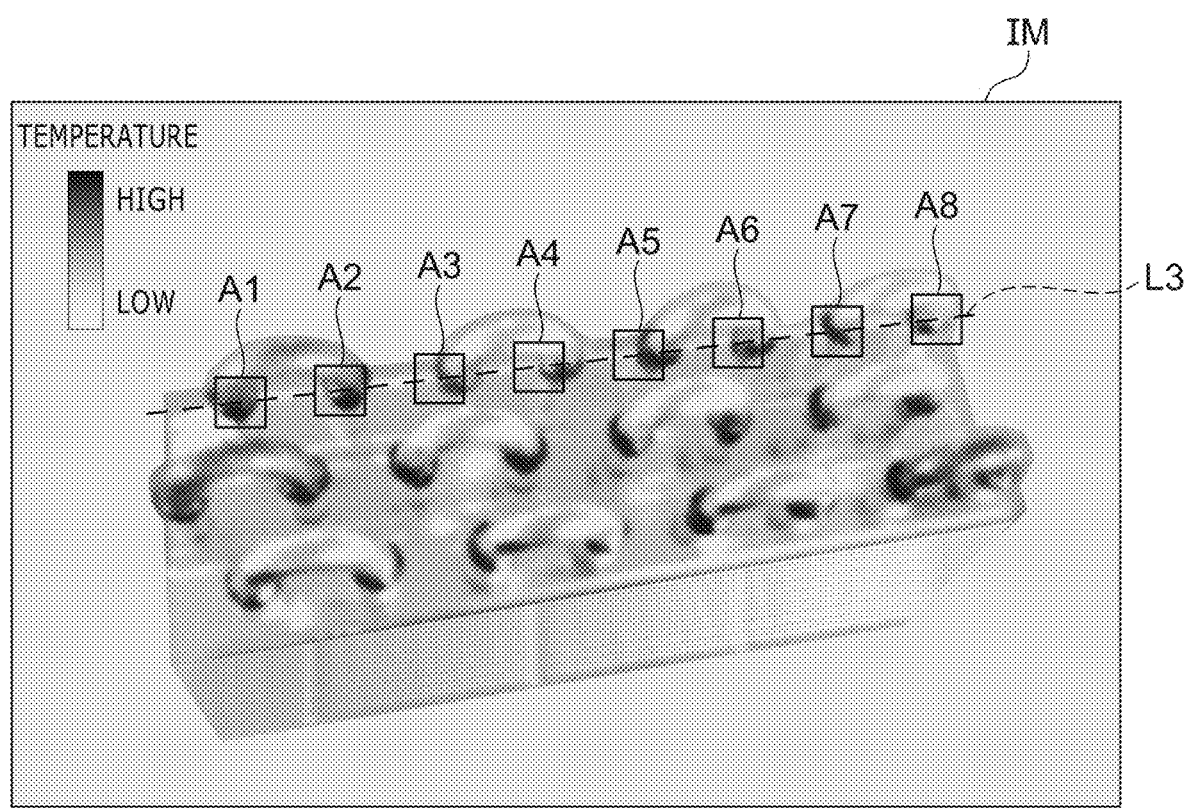
FIG. 6 is an image illustrating an example of setting measurement areas.

FIG. 6 is an image illustrating an example of setting measurement areas.

As shown in FIG. 6, the generation device 11 sets multiple measurement areas A1 to A8 along the selected measurement line (step S7). The multiple measurement areas A1 to A8 are set to be separated from each other. Favorably, each of the measurement areas includes multiple pixels in both the conveyance direction D1 and the orthogonal direction D2. This can prevent points at which the temperature profile is to be generated from being outside the measurement areas. The number of measurement areas, the size of the measurement areas, and the spacing between the measurement areas may be preset by the user or may be automatically set by the generation device 11.

The size of the measurement area may be set based on the movement amount of the conveyance object described above. When the size of the measurement area is less than the movement amount, there is a possibility that the point for which the temperature profile is to be generated may pass through the measurement area in the temperature detection interval of the thermal camera 12. It is therefore favorable for the length in the conveyance direction of the measurement area to be set to be greater than the movement amount of the conveyance object.

For example, the generation device 11 extracts portions that satisfy the setting condition related to the measurement area from the temperature distribution of the selected measurement line. A temperature greater or less than a threshold, a positive or negative temperature peak, a positive or negative temperature gradient not less than a threshold, or the like is set as the setting condition. The generation device 11 sets the measurement areas to the portions that satisfy the setting condition. In the example of FIGS. 5C and 6, the existence of a positive peak is the setting condition; and the measurement areas A1 to A8 are set at the portions at which the positive peaks p occur.

The generation device 11 stores the positions of the measurement areas in the memory device 14. Thereafter, the stored data related to the measurement area is used when acquiring a temperature profile for the same type of conveyance object.

Figure 7:
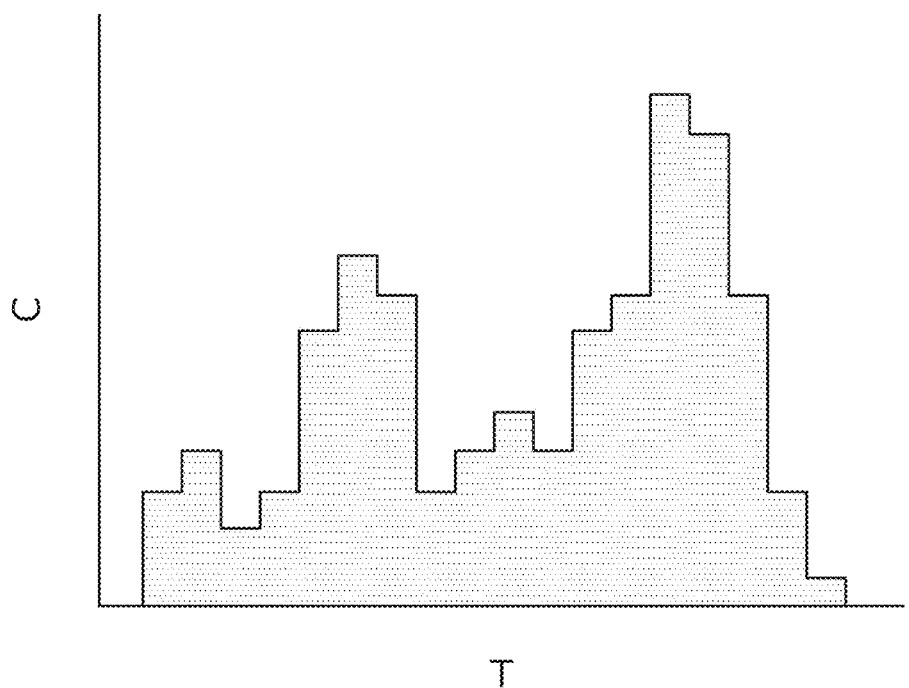
FIG. 7 is a graph illustrating a temperature distribution of a measurement area.

FIG. 7 is a graph illustrating a temperature distribution of a measurement area.

The generation device 11 acquires the temperatures of the set measurement areas in each image (step S8). The temperature in each measurement area is determined based on the temperatures at each point inside the measurement area. The generation device 11 acquires a temperature distribution such as that shown in FIG. 7. In FIG. 7, the horizontal axis is the temperature T, and the vertical axis is a count C that each temperature is measured. The count C corresponds to the number of points (pixels) at which the temperature is measured. For example, the generation device 11 determines the temperature of the measurement area to be the temperature having the highest measurement count. The generation device 11 may determine the temperature of the measurement area to be the average value, maximum value, minimum value, or median value of the temperature distribution.

Figure 8A:
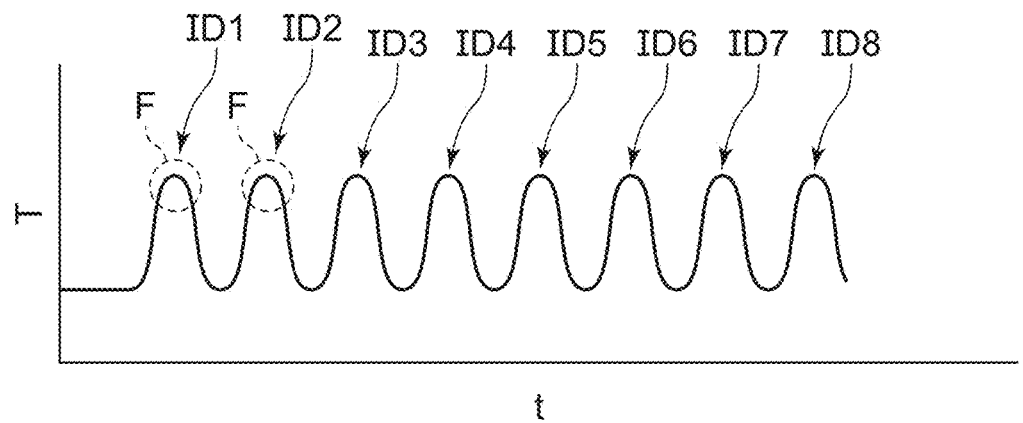
FIGS. 8A to 8C are graphs showing examples of time-series data of the temperatures of the measurement areas.
Figure 8B:
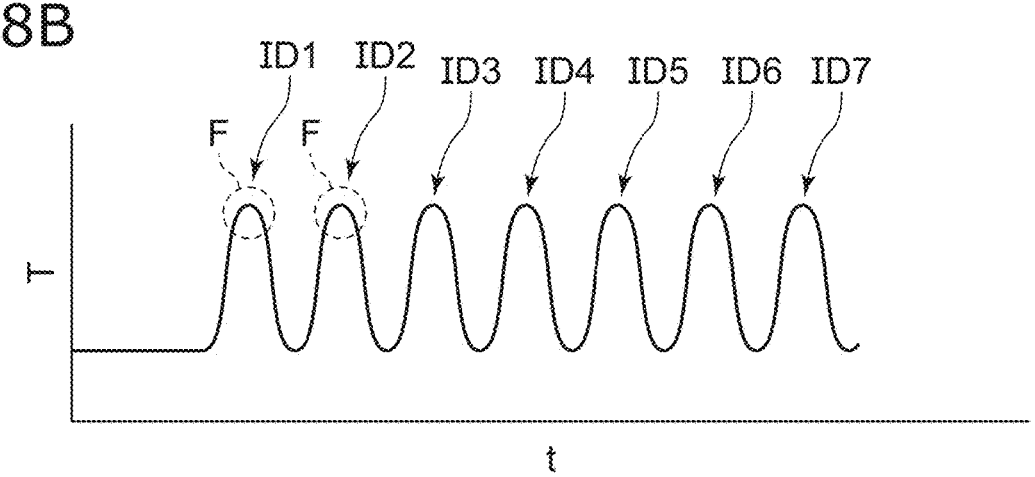
Figure 8C:
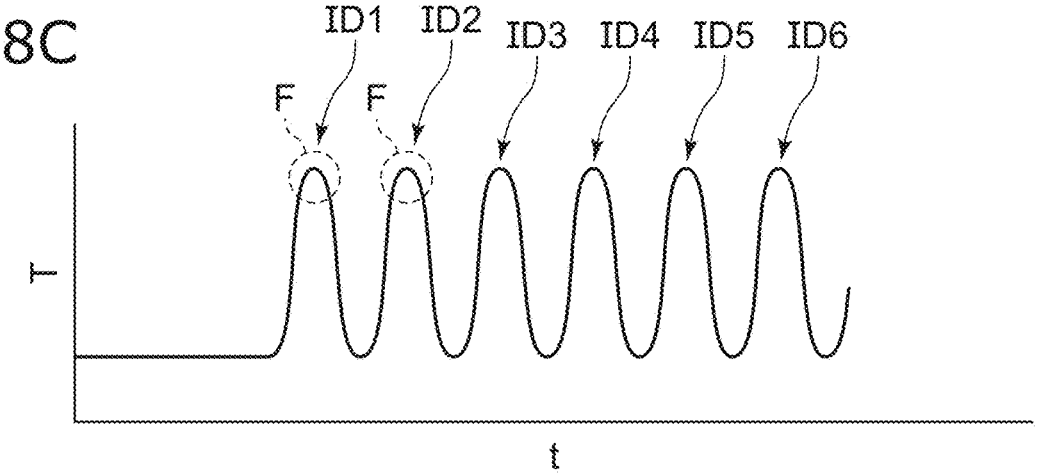

FIGS. 8A to 8C are graphs showing examples of time-series data of the temperatures of the measurement areas.

The generation device 11 generates the time-series data of the temperature by arranging the acquired temperatures in temporal order for each measurement area (step S9). FIGS. 8A to 8C show the time-series data of the temperature for some, i.e., the measurement areas A1 to A3, among the measurement areas shown in FIG. 6. In FIGS. 8A to 8C, the horizontal axis is time t, and the vertical axis is the temperature T.

The generation device 11 extracts portions of the time-series data that satisfy a preset condition as features (step S10). The generation device 11 assigns an identifier to each feature (step S11). The identifiers are determined according to the occurrence order of the features in one set of time-series data. Therefore, the same identifier is assigned to the features that have the same occurrence order in the sets of time-series data.

As one specific example, positive peaks are extracted as the features of the time-series data. As shown in FIG. 8A, the generation device 11 extracts multiple features F and assigns identifiers ID1 to ID8 respectively to the features F. The generation device 11 assigns the identifiers respectively to the features F similarly for the time-series data shown in FIGS. 8B and 8C.

Figure 9:
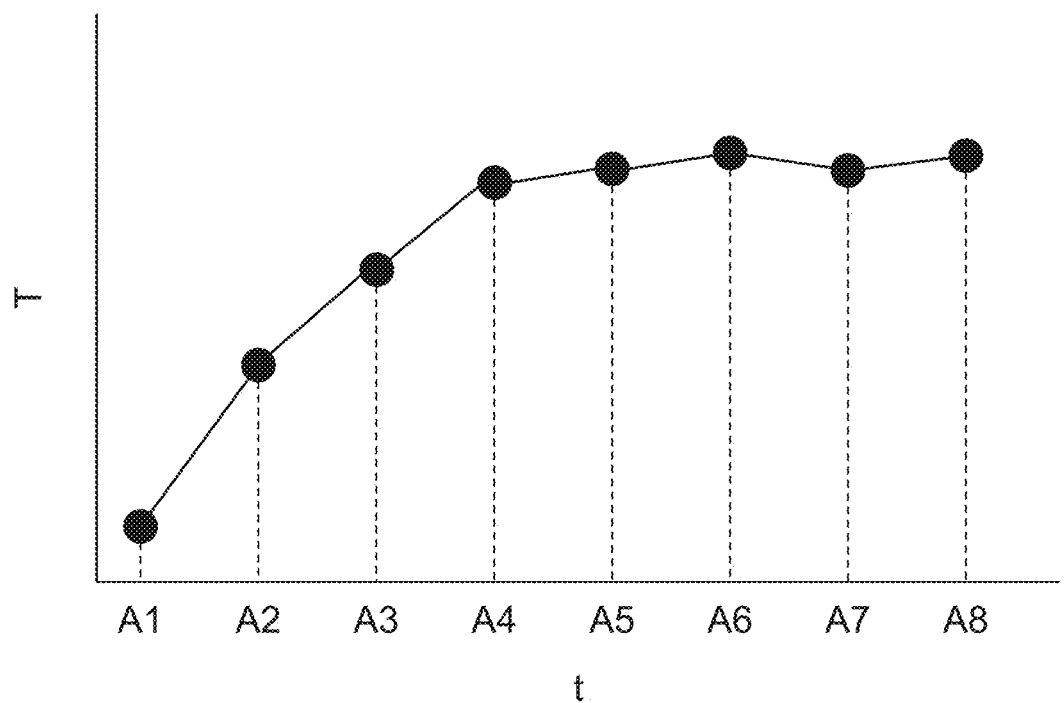
FIG. 9 is a graph illustrating a temperature profile.

FIG. 9 is a graph illustrating a temperature profile.

The generation device 11 arranges the temperatures of the features to which the same identifier is assigned in temporal order. For example, the temperature of the apex of the peak is used as the temperature of the feature. The temperature profile is generated as shown in FIG. 9 (step S12). In FIG. 9, the horizontal axis is the time t, and the vertical axis is the temperature T. The temperature profile shows the temperature change over time at a specific point of the conveyance object. The generation device 11 outputs the generated temperature profile (step S13). Also, the generation device 11 stores the temperature profile in the memory device 14.

Figure 10:
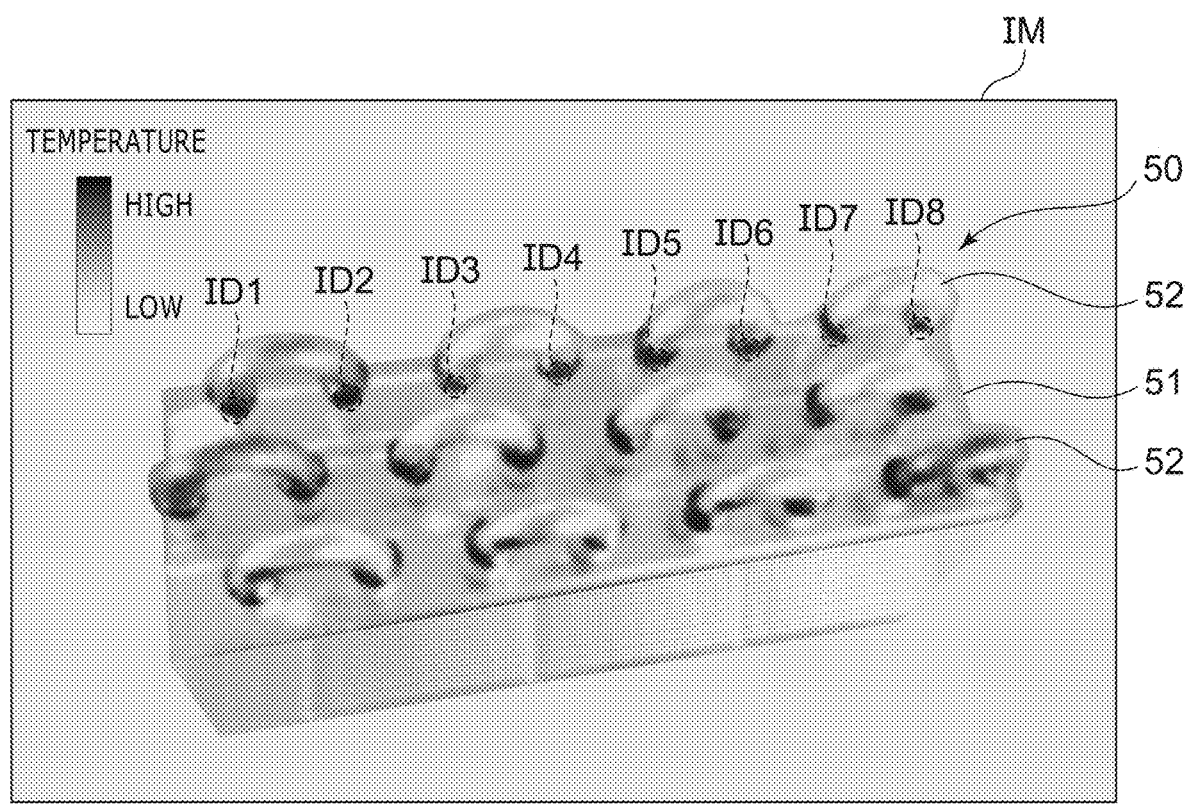
FIG. 10 illustrates the correspondence between the identifiers and the thermal image.

FIG. 10 illustrates the correspondence between the identifiers and the thermal image.

In the example described above, the identifiers ID1 to ID8 are assigned in each set of time-series data obtained at the multiple measurement areas A1 to A8 along the measurement line L3. The portions to which the identifiers are assigned correspond to the points for which the temperature profiles are to be obtained. FIG. 10 shows the portions to which the identifiers ID1 to ID8 are assigned in a thermal image. In the example, the identifiers ID1 to ID8 are assigned to each joining location between the member 51 and the pipes 52. The temperature profiles at the joining locations are generated thereby.

Advantages of the embodiment will now be described.

In production, heat processing of a workpiece may be performed to melt, join, thermally activate, etc. There are cases where the temperature profile of the heat processing affects the quality of the workpiece. Conventionally, the temperature profile is acquired at designated points in the heat processing for quality control. The thermal camera 12 can measure the surface temperature of the workpiece with high accuracy and without contact. Therefore, the thermal camera 12 is favorable for acquiring the temperature profile. For example, the temperature profile can be acquired by setting measurement areas that are fixed with respect to the images acquired by the thermal camera 12 and by arranging the temperatures of the measurement areas in temporal order.

On the other hand, when the workpiece moves with respect to the thermal camera 12, it is difficult to obtain the temperature profiles at specific points of the workpiece. For quality control, it is desirable to be able to acquire the temperature profiles at the specific points even in such cases.

For this problem, the generation device 11 according to the embodiment sets multiple measurement areas along the conveyance direction of the conveyance object in the images acquired by the thermal camera 12. Then, the generation device 11 generates time-series data of the temperature change over time in each measurement area. The generation device 11 generates the temperature profile of the conveyance object by using a portion of the temperatures extracted from the time-series data of the measurement areas. According to the embodiment, the temperature profile of the conveyance object can be generated even when the workpiece is conveyed.

Although it is favorable to include the detector 13 to reduce the calculation amount of the generation device 11, the detector 13 may be omitted. In such a case, step S1 is omitted. The thermal camera 12 repeatedly acquires the images regardless of whether or not the conveyance object is approaching the detection range of the thermal camera 12. In such a case as well, the time-series data is generated based on the temperatures of the measurement areas in the images. The temperature profiles are generated by extracting the temperatures of the features included in the time-series data of the measurement areas.

Modification

Figure 11:
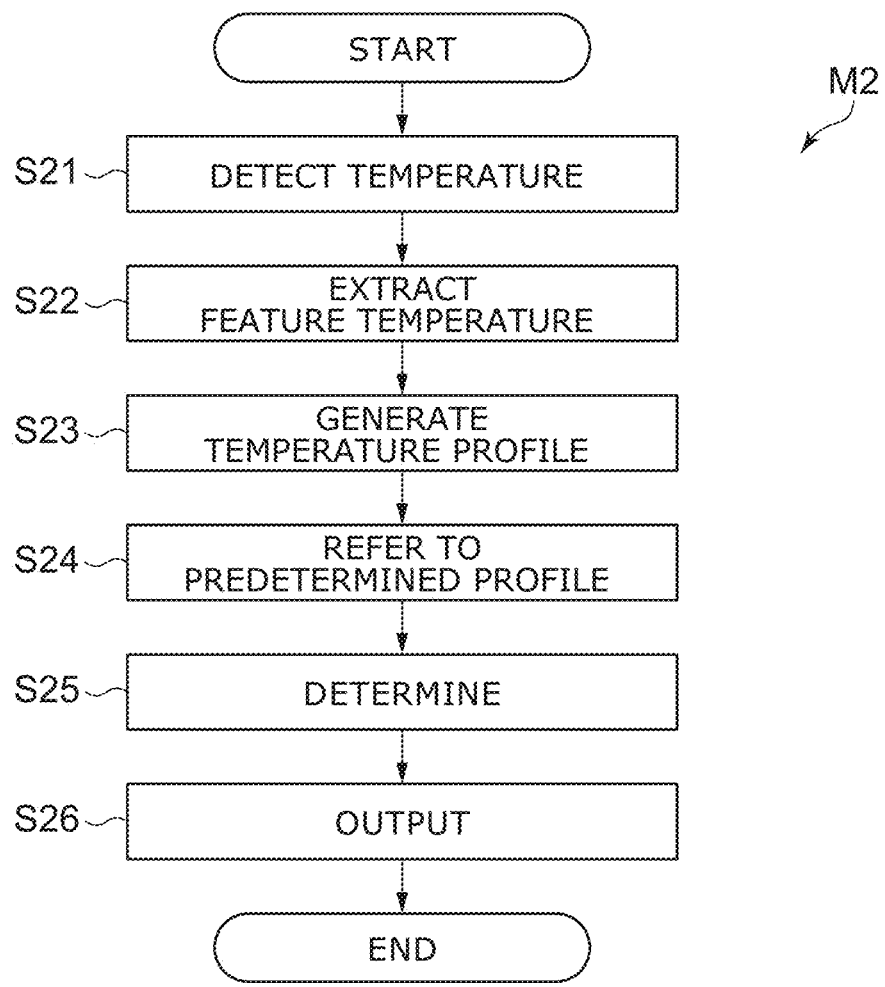
FIG. 11 is a flowchart showing a generation method according to a modification of the embodiment.

FIG. 11 is a flowchart showing a generation method according to a modification of the embodiment.

The generation device 11 also may determine the goodness of the conveyance object by using the generated temperature profile. In the generation method M2 shown in FIG. 11, the temperature of the conveyance object is detected similarly to step S2 shown in FIG. 2 (step S21). By performing steps S3 to S11, the temperatures of the feature are extracted from the time-series data of the temperatures (step S22). The temperature profile is generated by performing steps S12 and S13 (step S23).

When the temperature profile has been generated, the generation device 11 refers to a predetermined profile (step S24). The predetermined profile is a temperature profile related to the conveyance object that is prepared beforehand by the user, and is stored in the memory device 14. For example, the temperature profile at a specific point of the conveyance object obtained when the quality is good is stored as the predetermined profile. The generation device 11 compares the generated temperature profile and the predetermined profile and determines the goodness of the conveyance object for which the temperature profile is obtained (step S25). The generation device 11 outputs the temperature profile and the determination result (step S26).

For example, the generation device 11 calculates the temperature difference at each measurement area between the generated temperature profile and the predetermined profile. A threshold is preset for the sum, mean squared error, or average of the multiple temperature differences that are calculated. The goodness of the conveyance object is determined by comparing the sum, mean squared error, or average of the multiple temperature differences to the threshold.

The generation device 11 may compare image data of the generated temperature profile and image data of the predetermined profile. For example, the generation device 11 calculates the distance between the two sets of image data. A threshold for the distance is preset. The goodness of the conveyance object is determined based on the comparison result between the distance and the threshold.

Multiple thresholds may be set in each method described above. The generation device 11 ranks the quality of the conveyance object according to the comparison results with the multiple thresholds.

Or, the generation device 11 may determine the goodness of the conveyance object by inputting the generated temperature profile to a model or a classifier prepared beforehand. Models include, for example, neural networks. Supervised learning or unsupervised learning of the model is performed beforehand. Classifiers include, for example, a classifier trained with random forests, a Bayes classifier, etc. The model or the classifier outputs the determination result of the goodness according to the input of the temperature profile. When a model or a classifier is used, the reference to the predetermined profile by the generation device 11 is omitted.

Figure 12:
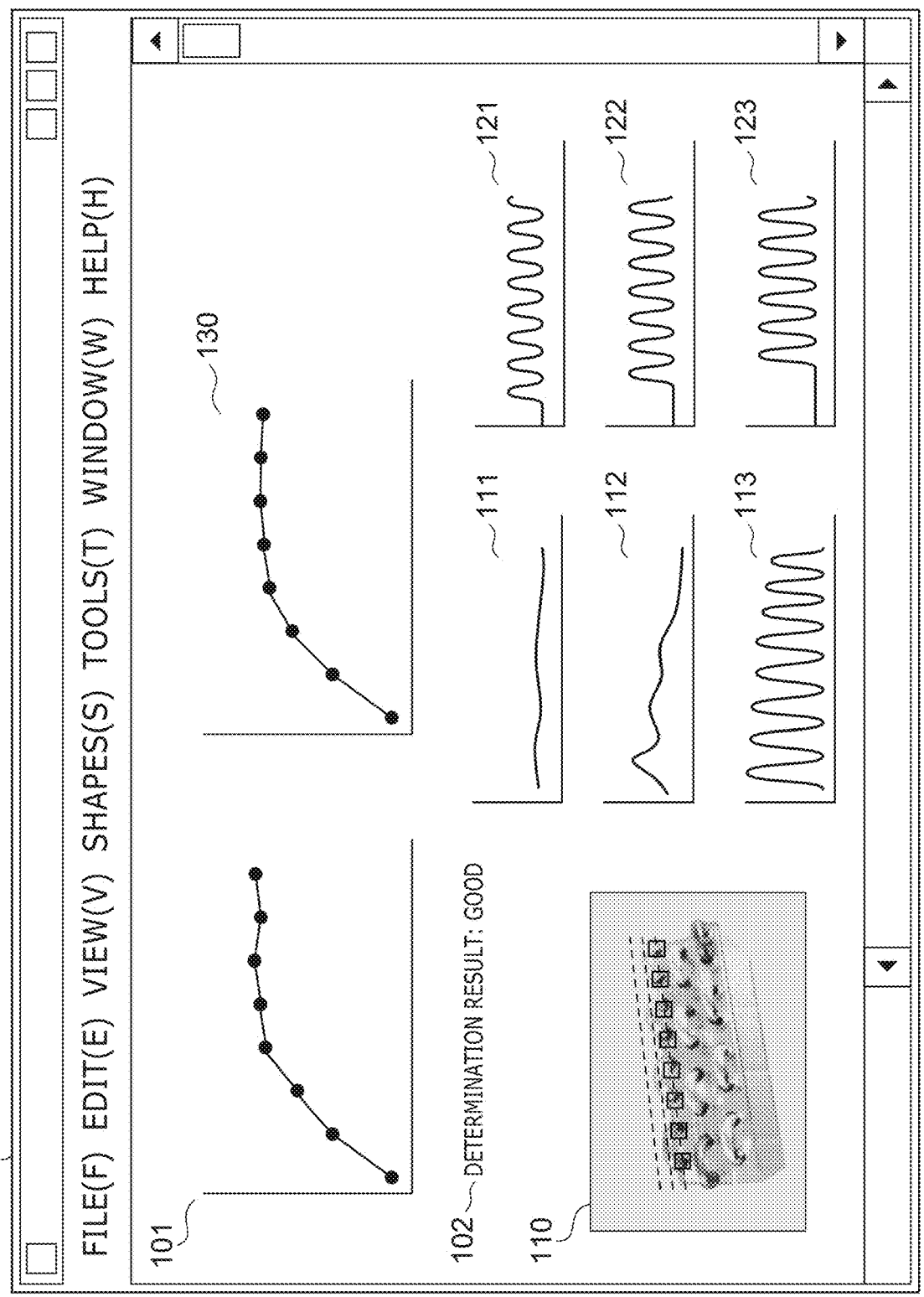
FIG. 12 is an example of output results of the generation device according to the embodiment.

FIG. 12 is an example of output results of the generation device according to the embodiment.

For example, the output device 16 is a monitor. As shown in FIG. 12, the generation device 11 displays a user interface (UI) 100. The UI 100 displays a generated temperature profile 101 and a determination result 102. To improve the convenience of the user, the UI 100 may also display an image 110 generated by the thermal camera 12, temperature distributions 111 to 113 along the measurement lines, time-series data 121 to 123 at the measurement areas, and a predetermined profile 130.

Figure 13:
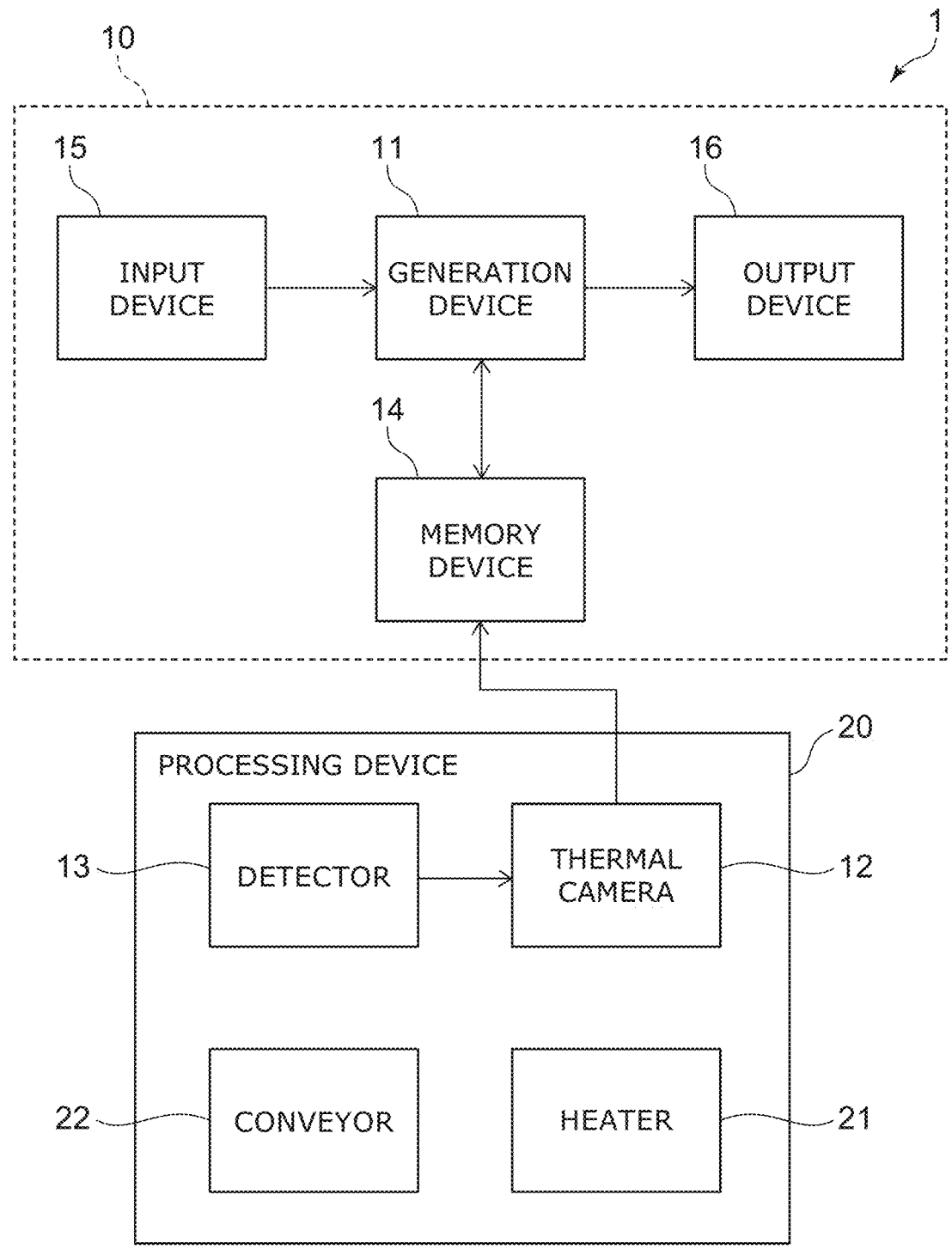
FIG. 13 is a schematic view showing a processing system according to the embodiment.

FIG. 13 is a schematic view showing a processing system according to the embodiment.

As shown in FIG. 13, the processing system 1 according to the embodiment includes the generation system 10 and a processing device 20. The processing device 20 includes a heater 21 and a conveyor 22. In the example, the thermal camera 12 and the detector 13 are embedded in the processing device 20.

The heater 21 heats the workpiece. The specific configuration of the heater 21 is arbitrary as long as the workpiece can be heated. For example, the heater 21 includes a burner that heats the workpiece by a flame, a lamp or a laser light source that heats the workpiece by light, or an electrode that heats the workpiece by a current.

The conveyor 22 conveys the workpiece to undergo heat processing. For example, the conveyor 22 sequentially conveys multiple workpieces in a designated direction at a constant speed. The conveyor 22 includes a belt conveyor, a roller conveyor, etc. The heater 21 heats the workpiece being conveyed by the conveyor 22.

The detector 13 detects the conveyance object (the workpiece) approaching the detection range of the thermal camera 12. The thermal camera 12 detects the temperature of the workpiece conveyed by the conveyor 22.

According to the processing system 1, the temperature profile of the workpiece that is heated while being conveyed by the processing device 20 can be generated.

Figure 14:
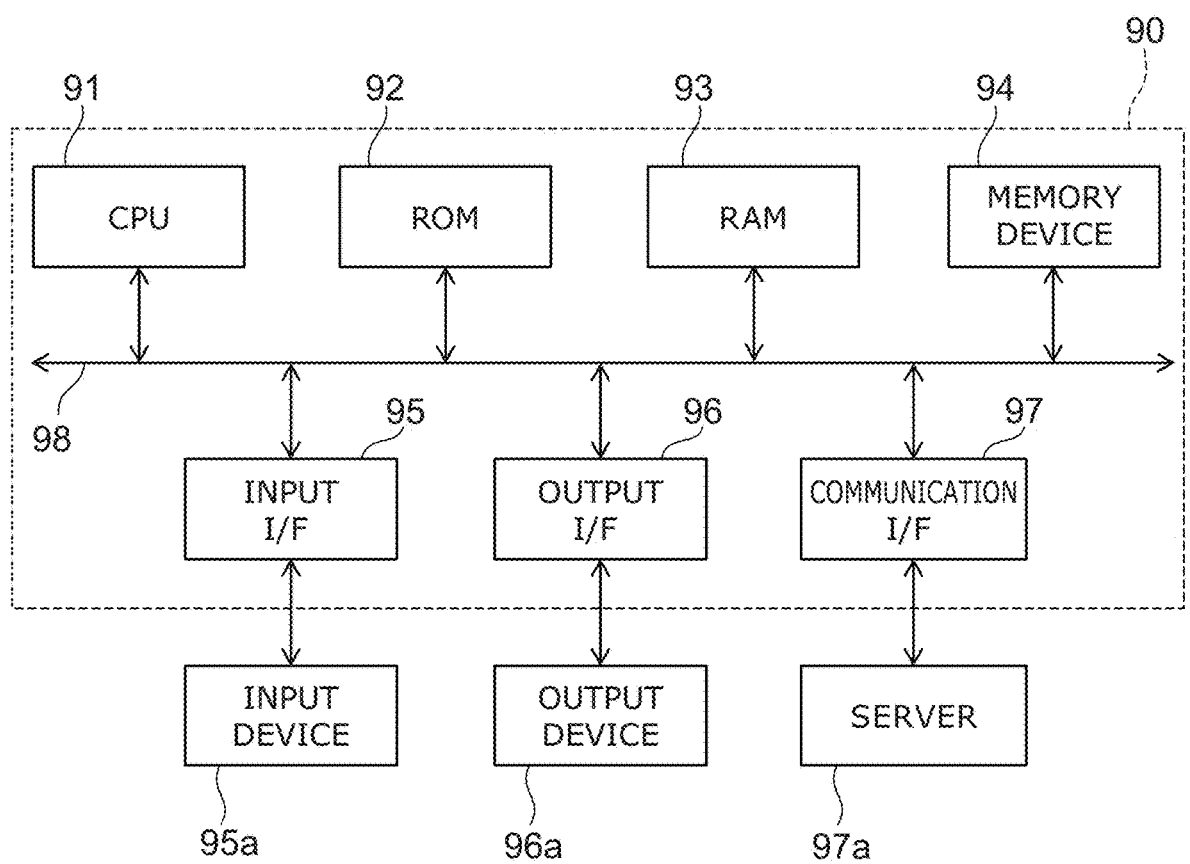
FIG. 14 is a schematic view showing a hardware configuration.

FIG. 14 is a schematic view showing a hardware configuration.

The generation device 11 includes, for example, the configuration of a computer 90 shown in FIG. 14. The computer 90 includes a CPU 91, ROM 92, RAM 93, a memory device 94, an input interface 95, an output interface 96, and a communication interface 97.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the computer 90 and an input device 95a. The input I/F 95 is, for example, a serial bus interface such as USB, etc. The CPU 91 can read various data from the input device 95a via the input I/F 95.

The output interface (I/F) 96 connects the computer 90 and an output device 96a. The output I/F 96 is, for example, an image output interface such as Digital Visual Interface (DVI), High-Definition Multimedia Interface (HDMI (registered trademark)), etc. The CPU 91 can transmit data to the output device 96a via the output I/F 96 and cause the output device 96a to display an image.

The communication interface (I/F) 97 connects the computer 90 and a server 97a that is outside the computer 90. The communication I/F 97 is, for example, a network card such as a LAN card, etc. The CPU 91 can read various data from the server 97a via the communication I/F 97.

The memory device 94 includes at least one selected from a hard disk drive (HDD) and a solid state drive (SSD). The input device 95a includes at least one selected from a mouse, a keyboard, a microphone (audio input), and a touchpad. The output device 96a includes at least one selected from a monitor, a projector, a speaker, and a printer. A device such as a touch panel that functions as both the input device 95a and the output device 96a may be used. The memory device 94, the input device 95a, and the output device 96a can be used respectively as the memory device 14, the input device 15, and the output device 16.

The functions of the generation device 11 may be realized by the collaboration of multiple computers. The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

According to the generation device, the generation method, or the processing system described above, a temperature profile of the conveyance object can be generated. Similar effects can be obtained by using a program to cause a computer to perform the generation method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A generation device,
the generation device acquiring a plurality of images of a temperature distribution of a conveyance object,
the plurality of images being generated by a thermal camera,
the generation device setting a plurality of measurement areas in each of the images along a conveyance direction of the conveyance object,
the generation device generating time-series data of temperature change over time for each of the plurality of measurement areas, and
the generation device generating a temperature profile of temperature change over time of the conveyance object by using a portion of temperatures extracted from the time-series data of the plurality of measurement areas.

2. The generation device according to claim 1, wherein
the time-series data of each of the plurality of measurement areas is compared to a condition,
the condition is preset, and
the portion of temperatures extracted from the time-series data satisfies the condition.

3. The generation device according to claim 1, wherein positive peaks are extracted as the portion of temperatures from the time-series data.

4. The generation device according to claim 1, wherein
a plurality of measurement lines is set along the conveyance direction in the images,
one of the measurement lines is selected based on temperature distributions of the plurality of measurement lines, and
the plurality of measurement areas is set along the one measurement line.

5. The generation device according to claim 1, wherein
a goodness of the conveyance object is determined by comparing the generated temperature profile to a profile prepared beforehand.

6. A generation system, comprising:
the generation device according to claim 1;
the thermal camera; and
an output device outputting the temperature profile.

7. A processing system, comprising:
the generation device according to claim 1; and a processing device heating the conveyance object while conveying the conveyance object.

8. A generation method, comprising:
acquiring a plurality of images of a temperature distribution of a conveyance object, the plurality of images being generated by a thermal camera;
setting a plurality of measurement areas in each of the images along a conveyance direction of the conveyance object;
generating time-series data of temperature change over time for each of the plurality of measurement areas; and
generating a temperature profile of temperature change over time of the conveyance object by using a portion of temperatures extracted from the time-series data of the plurality of measurement areas.

9. A non-transitory computer-readable storage medium storing a program,
the program causing a computer to execute the generation method according to claim 8.

* * * * *